(12) United States Patent
Throckmorton et al.

(10) Patent No.: US 9,127,697 B1
(45) Date of Patent: Sep. 8, 2015

(54) DYNAMICALLY STABLE PRESSURE CONTROL SYSTEM

(75) Inventors: Charles D. Throckmorton, Ames, IA (US); Stephen D. Cromer, Piedmont, SC (US); Glenn M. Mahony, Greenville, SC (US); Michael J. Stoltenow, Greenfield, MN (US); Chad J. Daniel, Ankeny, IA (US)

(73) Assignee: SAUER-DANFOSS INC., Ames, IA (US)

( * ) Notice: Subject to any disclaimer, the term of this patent is extended or adjusted under 35 U.S.C. 154(b) by 483 days.

(21) Appl. No.: 13/565,537

(22) Filed: Aug. 2, 2012

(51) Int. Cl.
*F15B 11/16* (2006.01)
*E02F 9/22* (2006.01)

(52) U.S. Cl.
CPC ............... *F15B 11/162* (2013.01); *E02F 9/226* (2013.01)

(58) Field of Classification Search
CPC ............................... F15B 11/162; E02F 9/226

USPC .................................................... 60/459, 456
See application file for complete search history.

(56) References Cited

U.S. PATENT DOCUMENTS

| 6,216,456 | B1 | 4/2001 | Mitchell | |
|---|---|---|---|---|
| 6,314,729 | B1 * | 11/2001 | Crull et al. | 60/456 |
| 6,848,255 | B2 * | 2/2005 | Chiaramonte | 60/456 |
| 6,966,614 | B2 | 11/2005 | Hamzeh et al. | |
| 7,111,458 | B2 | 9/2006 | Gandrud | |
| 7,240,486 | B2 * | 7/2007 | Huang et al. | 60/456 |

* cited by examiner

*Primary Examiner* — Thomas E Lazo
(74) *Attorney, Agent, or Firm* — Zarley Law Firm, P.L.C.

(57) ABSTRACT

A hydraulic pressure control system having a variable displacement pump fluidly connected to a hydraulic motor. The pump provides flow to a first circuit upon demand. Remaining flow is provided to a second circuit. The second circuit includes a pilot controlled pressure reducing valve that adjusts the pumps outlet pressure based upon a sensed loads taken from a conduit between the pressure control valve and an active flow regulator valve.

11 Claims, 3 Drawing Sheets

DYNAMICALLY STABLE PRESSURE CONTROL SYSTEM

BACKGROUND OF THE INVENTION

This invention relates to a hydraulic pressure control system and more particularly to a hydraulic pressure control system that produces a more consistent fluid flow rate.

Well-known in the art is the use of a pilot controlled pressure reducing valve to control the pressure of a load in a hydraulic system. Also known in the art is the use of a flow control valve to control the hydraulic flow rate to the load. In these systems flow control is fundamentally different than pressure control. As shown in FIG. 1, the load signal line in prior art systems is connected directly to the load conduit to port A where the conduit connection from the load conduit to the pilot controlled pressure reducing valve incorporates a fixed orifice.

Deficiencies in these prior art systems have been recognized. Not only are these systems unstable, they have reduced dynamic performance. Thus, a need exists in the art for a system that addresses these deficiencies.

Therefore, an objective of the present invention is to provide a pressure control system that produces a more consistent and stable dynamic performance.

A further objective of the invention is to provide a pressure control system that allows multiple consumes on a single pump.

These and other objectives will be apparent to one of ordinary skill in the art based upon the following written description, drawings and claims.

SUMMARY OF THE INVENTION

A hydraulic pressure control system having a variable displacement pump fluidly connected to a hydraulic motor. The pump provides flow to a first circuit upon demand. Remaining flow is provided to a second circuit. The second circuit includes a pilot controlled pressure reducing valve that adjusts the pumps outlet pressure based upon a sensed load taken from a conduit between the pressure control valve and an active flow regulator valve. A pressure compensated flow control has been added to this conduit to improve dynamic performance.

DETAILED DESCRIPTION OF THE PREFERRED EMBODIMENT

Figure 1:
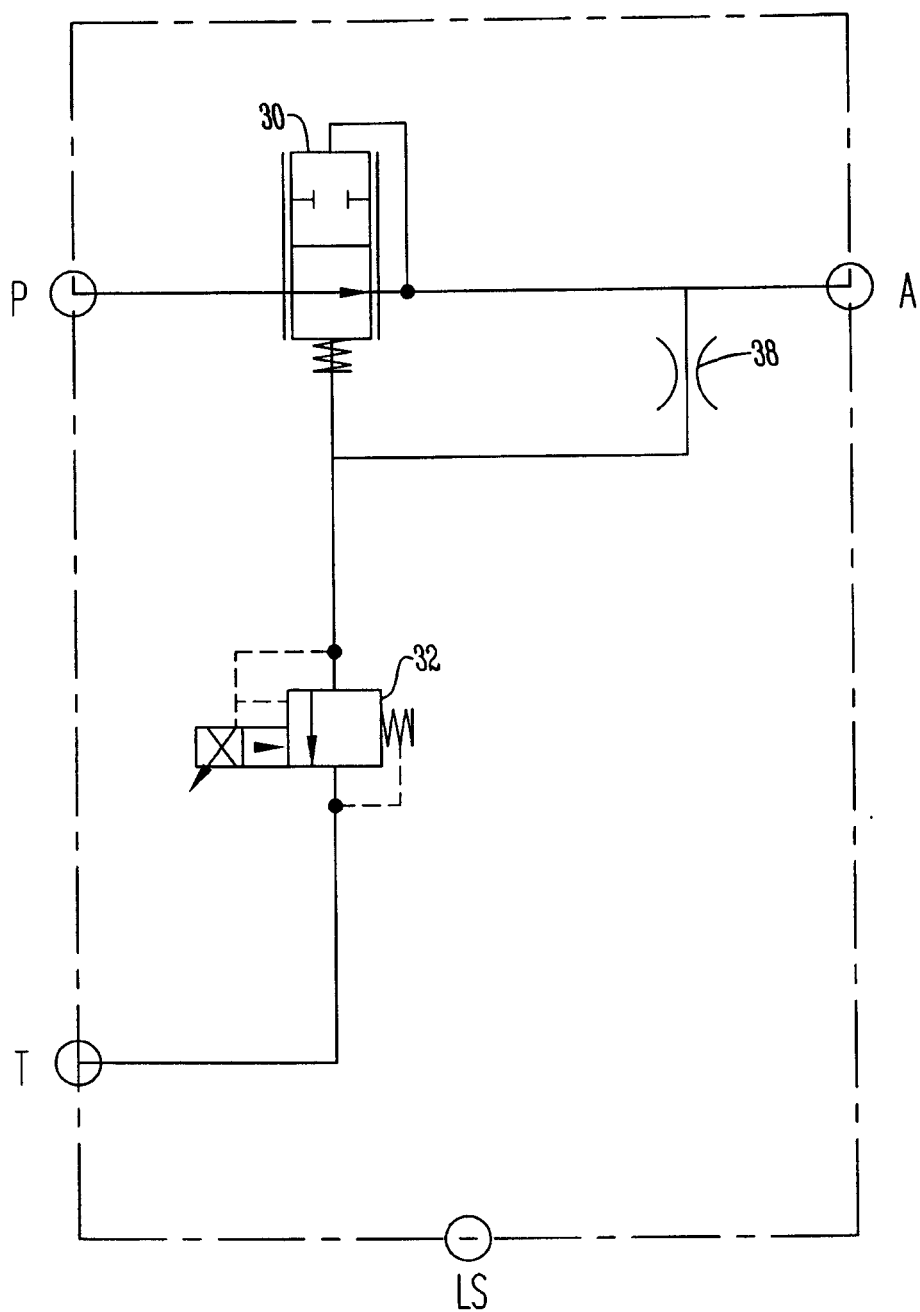
FIG. 1 is a schematic view of a prior art pressure control system.
Figure 2:
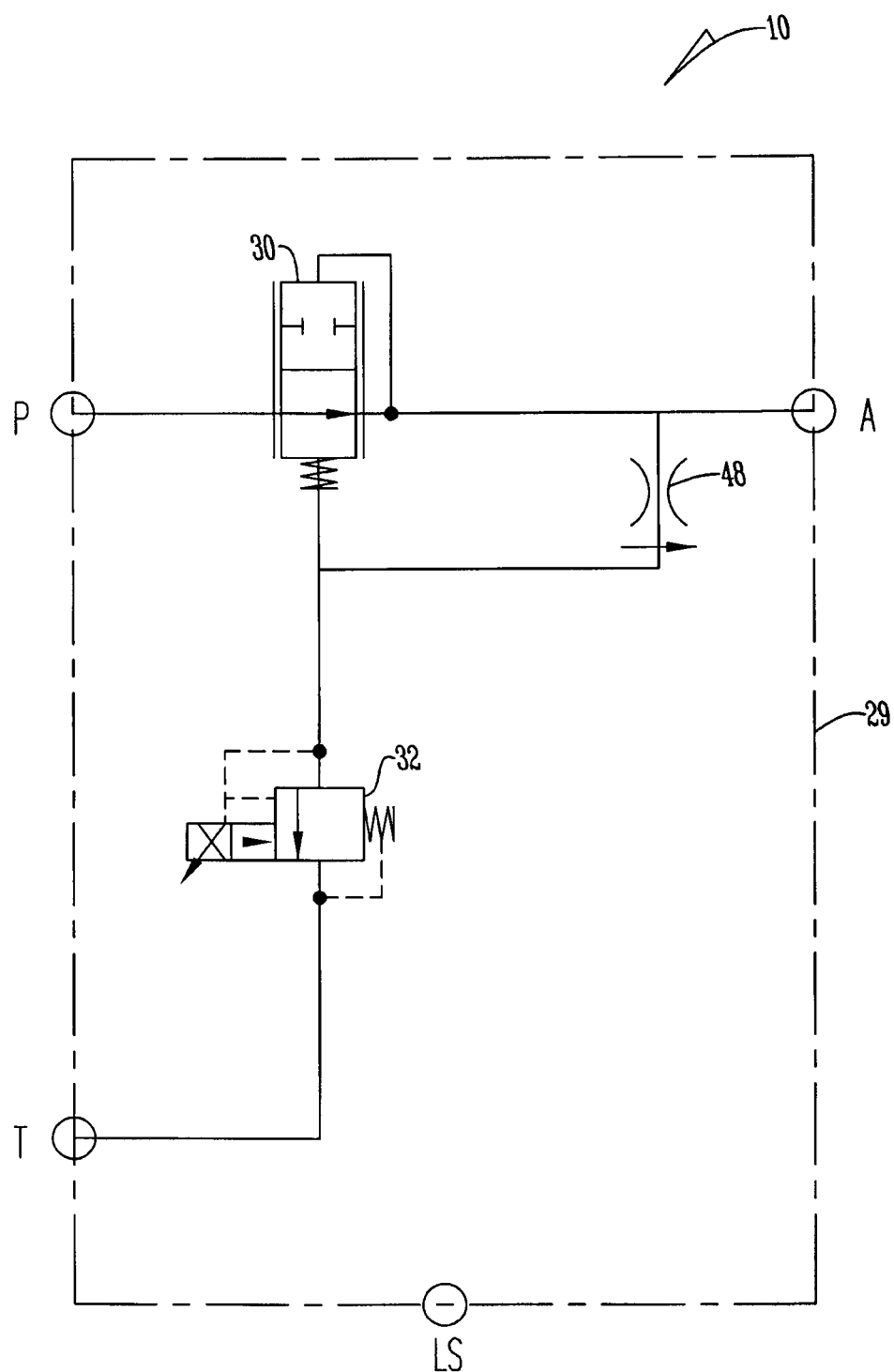
FIG. 2 is a schematic view of a pressure control valve.
Figure 3:
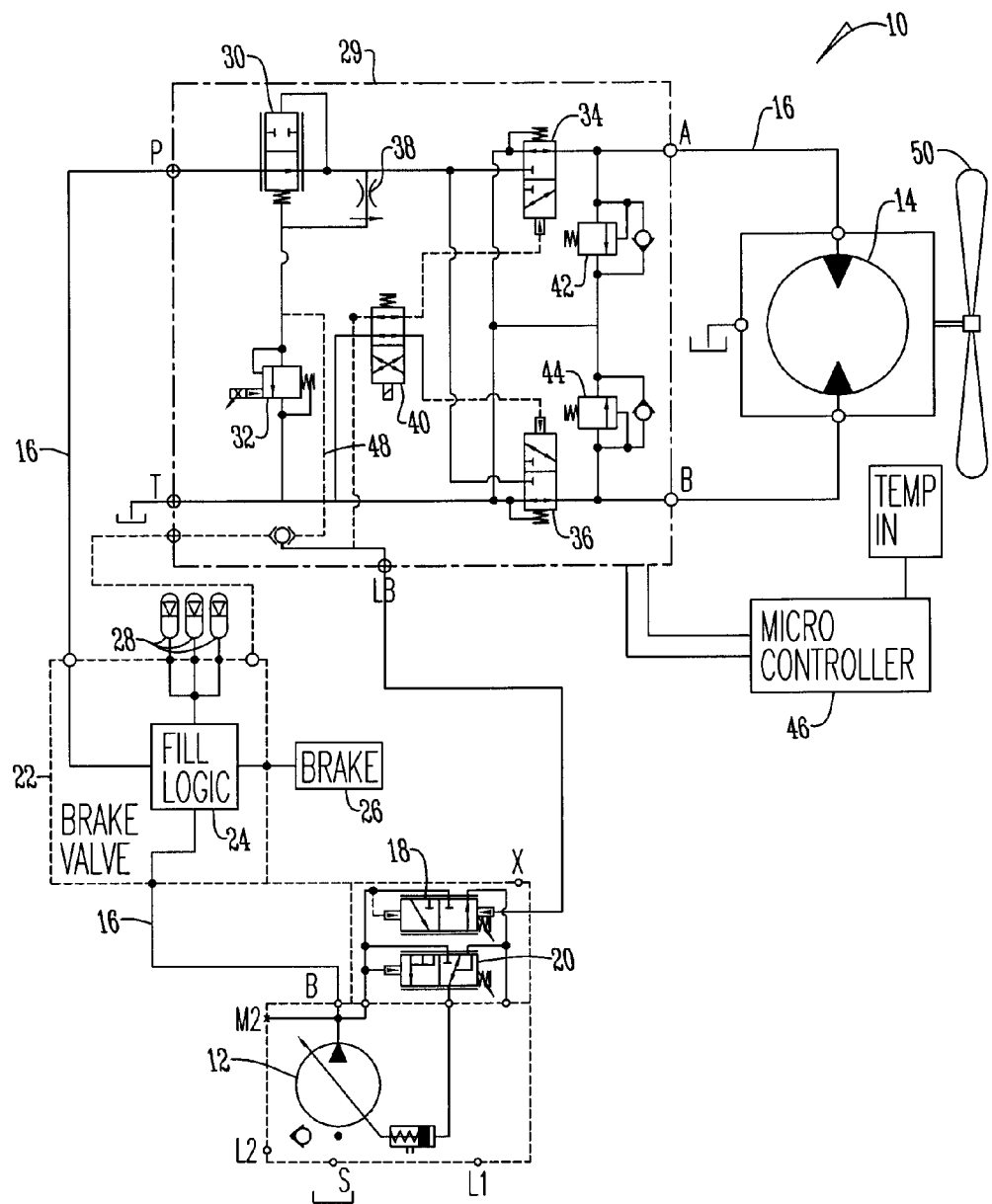
FIG. 3 is a schematic view of a pressure control valve in a system.

Referring to FIG. 3, the pressure control system 10 has a variable displacement pump 12 that is connected to a fixed displacement hydraulic motor 14 by fluid lines 16. The pump is also fluidly connected to pilot controlled pressure valves 18 and 20 and brake valve circuit 22. Brake valve circuit 22 includes fill logic 24 that is connected to brake 26 and accumulators 28.

The brake valve circuit 22 is connected to a fan circuit 29 that includes pilot controlled pressure reducing valve 30 that is connected to proportional pressure relief valve 32, directional control valves 34 and 36 and active flow regulator valve 38. Flow valves 34 and 36 are connected to solenoid valve 40, shock/check valves 42 and 44, and motor 14. Motor 14 is connected to fan 50.

The electro proportional relief valve 32 and solenoid valve 40 are controlled by a micro controller 46. The micro controller 46 is also used to detect operational parameters of the hydraulic system 10. From these operational parameter readings the control system 29 will actuate valves 32 and 40 according to the need of the system. These parameters include, but are not limited to the temperature of the hydraulic fluid, the pressure in hydraulic line 16 with high and low pressure sides A and B, and the sensed load. The load sense line 48 is taken from the pressure signal controlled by pressure control valve 32 between the pressure control valve 32 and the active flow regulator valve 38.

In operation, the pump 12 provides flow to the brake valve circuit 22 upon demand. The remaining flow is available for the fan circuit 29 which operates fan 50. The fan 50 speed is controlled by the pressure control system. When the pressure control valve 32 is not used, the fan 50 will turn at a speed greater than requested when brake valve pressure is greater than that required by the fan 50 and the pump 12 has more flow production then is required by the sum of the load from both the brake valve 22 and the fan 50. Utilizing a pressure compensated flow control valve to maintain a constant flow rate to the pressure control valve leads to more consistent performance.

Accordingly, a pressure control system has been disclosed that, at the very least, meets all the stated objectives.

What is claimed is:

1. A hydraulic pressure control system, comprising:
   a variable displacement hydraulic pump;
   an electro proportional pressure reducing valve connected to a supply line and connected to a hydraulic motor;
   a solenoid valve connected to the supply line and the motor;
   a pilot controlled pressure reducing valve connected to the electro proportional flow control valve and an active flow regulator valve, and
   a load sensor line attached to a conduit between the pilot controlled pressure reducing valve and the active flow regulator valve.

2. The system of claim 1 further comprising a controller that actuates the pressure reducing valve based upon operational parameter readings from the control system.

3. The system of claim 1 wherein a micro-controller actuates the electro proportional relief valve and the solenoid valve based upon operational parameters.

4. A hydraulic pressure control system comprising:
   a variable displacement pump;
   a first hydraulic circuit that receives flow from the pump upon demand;
   a second hydraulic circuit having an electro proportional pressure reducing valve, a pilot controlled pressure reducing valve, and a solenoid valve that receives the remaining flow from the pump and provides flow to a hydraulic motor for use by a consumer.

5. The system of claim 4 wherein the second circuit includes a pilot controlled pressure reducing valve that adjusts the pumps outlet pressure based upon a sensed load.

6. The system of claim 4 wherein the second circuit includes a pressure compensated flow control valve that maintains a consistent flow rate through a pressure control valve.

7. The system of claim 6 wherein a load sensor line is attached to a flow conduit between the pressure control valve and an active flow regulator valve.

8. The system of claim 4 wherein a rotational speed of the consumer is greater than requested when the pressure of the first circuit is greater than required pressure of the second circuit and the pump has more flow production than the sum of the load of the first circuit and the second circuit.

9. The system of claim 4 further comprising a pair of directional control valves connected to a supply line, the solenoid valve, and a motor.

10. The system of claim 9 further comprising a pair of check valves connected between the directional control valves and the motor.

11. The system of claim 4 wherein the pilot controlled pressure reducing valve is activated to reduce system flow to a consumer when pressure form the first system is greater than required by the consumer.

* * * * *